United States Patent
Valdes et al.

(10) Patent No.: US 9,748,763 B2
(45) Date of Patent: Aug. 29, 2017

(54) CIRCUIT PROTECTION DEVICES AND METHODS OF MONITORING PROTECTION DEVICES IN A POWER DISTRIBUTION SYSTEM

(71) Applicant: General Electric Company, Schenectady, NY (US)

(72) Inventors: Marcelo Esteban Valdes, Burlington, CT (US); Michael Constantin Von Kannewurff, Middlebury, CT (US)

(73) Assignee: General Electric Company, Schenectady, NY (US)

( * ) Notice: Subject to any disclaimer, the term of this patent is extended or adjusted under 35 U.S.C. 154(b) by 402 days.

(21) Appl. No.: 14/532,740

(22) Filed: Nov. 4, 2014

(65) Prior Publication Data

US 2016/0126717 A1 May 5, 2016

(51) Int. Cl.
*H02H 7/00* (2006.01)
*H02H 7/30* (2006.01)
*H02H 3/033* (2006.01)
*H02H 3/04* (2006.01)

(52) U.S. Cl.
CPC ............... *H02H 7/30* (2013.01); *H02H 3/033* (2013.01); *H02H 3/04* (2013.01)

(58) Field of Classification Search
USPC .......................................... 361/93.1, 64, 115
See application file for complete search history.

(56) References Cited

U.S. PATENT DOCUMENTS

| | | | |
|---|---|---|---|
| 4,271,444 A | | 6/1981 | Howell |
| 5,629,869 A | * | 5/1997 | Johnson ............ H01H 11/0062 361/88 |
| 5,875,088 A | | 2/1999 | Matsko et al. |
| 6,297,939 B1 | | 10/2001 | Bilac et al. |
| 6,356,422 B1 | | 3/2002 | Bilac et al. |
| 7,599,161 B2 | | 10/2009 | Premerlani et al. |
| 7,940,051 B2 | | 5/2011 | Ulinskas |
| 7,986,503 B2 | | 7/2011 | Papallo et al. |
| 8,207,742 B2 | | 6/2012 | Sawhney et al. |
| 8,564,923 B2 | | 10/2013 | Carlino et al. |
| 2009/0251148 A1 | * | 10/2009 | Finlay, Sr. ............ G01R 31/14 324/424 |
| 2012/0316805 A1 | * | 12/2012 | Lagree ..................... H02H 7/30 702/58 |
| 2014/0078631 A1 | * | 3/2014 | Valdes ................... H02H 7/262 361/87 |

(Continued)

FOREIGN PATENT DOCUMENTS

EP            2110919 A2    10/2009

*Primary Examiner* — Ronald W Leja
(74) *Attorney, Agent, or Firm* — General Electric Company (57) ABSTRACT

Circuit protection devices, power distribution systems, and methods of monitoring circuit protection devices are described. In one example, a method of monitoring a circuit protection device in a zone selective interlocking (ZSI) system includes monitoring a variable associated with operation of the circuit protection device, determining, based at least in part on the monitored variable, when a likelihood of a malfunction of the circuit protection device exceeds a predetermined threshold, and preventing the circuit protection device from outputting a ZSI blocking signal when the likelihood of the malfunction of the circuit protection device exceeds the threshold.

20 Claims, 2 Drawing Sheets

(56) References Cited

U.S. PATENT DOCUMENTS

| | | | |
|---|---|---|---|
| 2015/0162741 A1* | 6/2015 | Valdes | H02H 7/263 361/87 |
| 2016/0126717 A1* | 5/2016 | Valdes | H02H 7/30 361/93.1 |
| 2016/0141861 A1* | 5/2016 | Dougherty | H02H 7/30 361/93.1 |
| 2016/0149393 A1* | 5/2016 | Valdes | H02H 3/305 361/93.1 |

* cited by examiner

CIRCUIT PROTECTION DEVICES AND METHODS OF MONITORING PROTECTION DEVICES IN A POWER DISTRIBUTION SYSTEM

BACKGROUND

The present application relates generally to power distribution systems and, more particularly, to monitoring circuit protection devices in power distribution systems.

Known electrical distribution systems include a plurality of switchgear lineups including circuit breakers that are each coupled to one or more loads. The circuit breakers typically include a trip unit that controls the circuit breakers based upon sensed current flowing through the circuit breakers. More specifically, the trip unit causes current flowing through the circuit breaker to be interrupted if the current is outside of acceptable conditions.

Some known circuit breakers are programmed with one or more current thresholds (also known as "pickup" thresholds) that identify undesired current levels for the circuit breaker. If a fault draws current in excess of one or more current thresholds for a predetermined amount of time, for example, the trip unit typically activates the associated circuit breaker to stop current from flowing through the circuit breaker. However, in power distribution systems that include a plurality of circuit breakers, a typical arrangement uses a hierarchy of circuit breakers. Large circuit breakers (i.e., circuit breakers with a high current rating) are positioned closer to a power source than lower current feeder circuit breakers and feed the lower current feeder circuit breakers. Each feeder circuit breaker may feed a plurality of other circuit breakers, which connect to loads or other distribution equipment.

A fault may occur anywhere in the circuit breaker hierarchy. When a fault occurs, each circuit breaker that has the same fault current flowing through it may detect different amounts of fault current as a result of varying sensor sensitivities and/or tolerances. When the fault occurs, the circuit breaker closest to the fault should operate to stop current from flowing through the circuit breaker. If a circuit breaker higher in the hierarchy trips, multiple circuits or loads may unnecessarily lose service.

To accommodate for the varying tolerances and to ensure that multiple circuit breakers do not unnecessarily trip based on the same fault current, the current thresholds of at least some known circuit breakers are nested with each other to avoid overlapping fault current thresholds. In some other known systems, circuit breakers in a lower tier send coordination or blocking signals to higher tier circuit breakers upon detection of a fault current. The upper tier circuit breakers' operation is coordinated with the operation of the lower tier circuit breaker in response to the blocking signal. A circuit breaker that is not functioning properly may still send blocking signals to higher tier circuit breakers, which will operate with the expectation that the lower tier/malfunctioning circuit breaker has identified the fault and is attempting to handle the fault. If the fault continues and the malfunctioning lower tier circuit breaker does not trip, the higher tier circuit breaker will eventually trip. The delay between fault detection and tripping will generally be longer when the higher tier circuit breaker is receiving a blocking signal than it would have been if the lower tier circuit breaker had tripped or if the upper tier circuit breaker had not been receiving the blocking signal.

BRIEF DESCRIPTION

In one aspect, a method of monitoring a circuit protection device in a zone selective interlocking (ZSI) system includes monitoring a variable associated with operation of the circuit protection device, determining, prior to a fault event and based at least in part on the monitored variable, when a likelihood of a malfunction of the circuit protection device exceeds a predetermined threshold, and preventing the circuit protection device from outputting a ZSI blocking signal when the likelihood of the malfunction of the circuit protection device exceeds the threshold.

In another aspect, a circuit protection device includes a trip mechanism configured to interrupt a current flowing through the circuit protection device and a trip unit operatively coupled to the trip mechanism. The trip unit is configured to monitor current flowing through the circuit protection device, monitor a variable associated with operation of the circuit protection device, determine whether the monitored current exceeds a predetermined zone selective interlocking (ZSI) blocking threshold, determine, prior to a fault event and based at least in part on the monitored variable, when a likelihood of a malfunction of the circuit protection device exceeds a predetermined functionality threshold, output a ZSI blocking signal when the monitored current exceeds the ZSI blocking threshold and the likelihood of the circuit protection device not functioning does not exceed the functionality threshold, and prevent output of the ZSI blocking signal when the likelihood of the malfunction of the circuit protection device exceeds the functionality threshold.

In yet another aspect, a power distribution system includes a first circuit protection configured to interrupt a current flowing through the first circuit protection device, a second circuit protection device downstream of the first circuit protection device, and a monitoring system coupled to the second circuit protection device. The second circuit protection device includes a trip mechanism configured to interrupt current flowing through the second circuit protection device and a trip unit operatively coupled to the trip mechanism. The trip unit is configured to monitor current flowing through the second circuit protection device, determine whether the monitored current exceeds a predetermined zone selective interlocking (ZSI) blocking threshold, and output a ZSI blocking signal to the first circuit protection device when the monitored current exceeds the ZSI blocking threshold. The monitoring system is configured to monitor a variable associated with operation of the second circuit protection device, determine, prior to a fault event and based at least in part on the monitored variable, when a likelihood of a malfunction of the second circuit protection device exceeds a predetermined functionality threshold, and prevent output of the ZSI blocking signal from the second circuit protection device when the likelihood of the malfunction of the second circuit protection device exceeds the functionality threshold.

DETAILED DESCRIPTION

Exemplary embodiments of circuit protection devices, power distribution systems, and methods of monitoring circuit protection devices and/or power distribution systems are described herein. The exemplary power distribution systems include circuit protection devices arranged in tiers in a zone selective interlocking (ZSI) configuration. A monitoring system continuously monitors a variable associated with operation of a circuit protection device and determines, before a fault event and based at least in part on the monitored variable, when the circuit protection device has failed or is likely to fail to operate. The monitoring system then prevents the circuit protection device from outputting a ZSI blocking signal to an upstream circuit protection device when a fault event occurs. If a blocking signal is not received, the upstream circuit protection device will continue to operate in its unrestrained state and will provide protection for the downstream circuit protection device, which may have failed or may fail to operate properly in response to the fault event.

Figure 1:
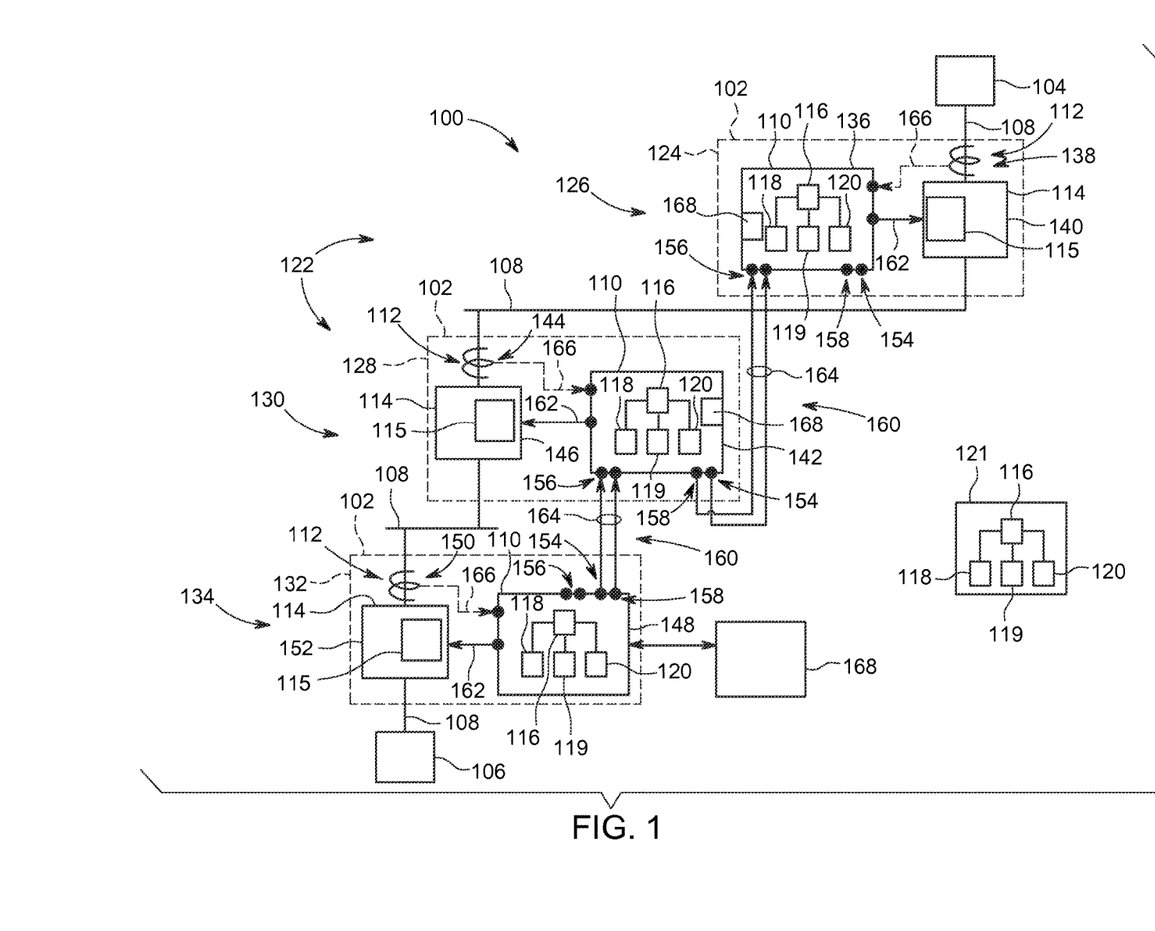
FIG. 1 is a schematic block diagram of an exemplary power distribution system.

FIG. 1 is a schematic block diagram of a portion of an exemplary power distribution system 100 illustrating a plurality of circuit protection devices 102.

Each circuit protection device 102 is configured to control a delivery of power from one or more electrical power sources 104 to one or more loads 106. Electrical power sources 104 may include, for example, one or more generators or other devices that provide electrical current (and resulting electrical power) to loads 106. The electrical current may be transmitted to loads 106 through one or more electrical distribution lines or busses 108 coupled to circuit protection devices 102. Loads 106 may include, but are not limited to only including, machinery, motors, lighting, and/or other electrical and mechanical equipment of a manufacturing or power generation or distribution facility.

In an exemplary embodiment, circuit protection device 102 is a circuit breaker. Alternatively, circuit protection device 102 may be any other device that enables power distribution system 100 to function as described herein. In an exemplary embodiment, each circuit protection device 102 includes a trip unit 110 operatively coupled to a sensor 112 and a trip mechanism 114. Trip unit 110, in an exemplary embodiment, is an electronic trip unit (ETU) that includes a processor 116 coupled to a memory 118, an input device 119, and a display device 120. Trip unit 110 may include, or may be considered to be, a computing device. In other embodiments, trip units 110 may be any other suitable type of trip unit. In some embodiments, one or more of circuit protection devices 102 include a different type of trip unit 110 and/or is a different type of circuit protection device than at least one other of circuit protection devices 102.

Sensor 112, in an exemplary embodiment, is a current sensor, such as a current transformer, a Rogowski coil, a Hall-effect sensor, and/or a shunt that measures a current flowing through trip mechanism 114 and/or circuit protection device 102. Alternatively, sensor 112 may include any other sensor that enables power distribution system 100 to function as described herein. In an exemplary embodiment, each sensor 112 generates a signal representative of the measured or detected current (hereinafter referred to as "current signal") flowing through an associated trip mechanism 114 and/or circuit protection device 102. In addition, each sensor 112 transmits the current signal to processor 116 associated with, or coupled to, trip mechanism 114. Each processor 116 is programmed to activate trip mechanism 114 to interrupt a current provided to a load 106 or an electrical distribution line or buss 108 if the current signal, and/or the current represented by the current signal, exceeds a current threshold.

In the example embodiment, trip mechanism 114 is a circuit breaker. Trip mechanism 114 includes a trip coil 115, also sometimes referred to as a flux shifter. An electric signal is provided to trip coil 115 to cause the circuit breaker to trip and interrupt the flow of current through trip mechanism 114. In other embodiments, trip mechanism 114 includes, for example, one or more other circuit breaker devices and/or arc containment devices. Exemplary circuit breaker devices include, for example, circuit switches, contact arms, and/or circuit interrupters that interrupt current flowing through the circuit breaker device to a load 106 coupled to the circuit breaker device. An exemplary arc containment device includes, for example, a containment assembly, a plurality of electrodes, a plasma gun, and a trigger circuit that causes the plasma gun to emit ablative plasma into a gap between the electrodes in order to divert energy into the containment assembly from an arc or other electrical fault that is detected on the circuit.

Each processor 116 controls the operation of a circuit protection device 102 and gathers measured operating condition data, such as data representative of a current measurement (also referred to herein as "current data"), from a sensor 112 associated with a trip mechanism 114 coupled to processor 116. Processor 116 stores the current data in a memory 118 coupled to processor 116. It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 118 stores program code and instructions, executable by processor 116, to control circuit protection device 102. Memory 118 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 118. Memory 118 may also be, or include, a detachable or removable memory, including, but not limited to, a suitable cartridge, disk, CD ROM, DVD or USB memory.

Input device 119 receives input from, for example, a user, another trip unit 110, a remote computing device, etc. Input device 119 may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, a keypad, one or more buttons, and/or an audio input interface. A single component, such as a touch screen, may function as both display device 120 and input device 119. In some embodiments, input device 119 may include a communication interface to receive input from a remote computing device (including from another trip unit 110). Although a single input device 119 is shown for each trip unit 110, a trip unit 110 may include more than one input device 119 or no input device 119.

Display device 120 visually presents information about circuit protection device 102 and/or trip mechanism 114. Display devices 120 may include a vacuum fluorescent display (VFD), one or more light-emitting diodes (LEDs), liquid crystal displays (LCDs), cathode ray tubes (CRT), plasma displays, and/or any suitable visual output device capable of visually conveying information to a user. For example, processor 116 may activate one or more components of display device 120 to indicate that circuit protection device 102 and/or trip mechanism 114 is active and/or operating normally, is receiving a blocking signal, is transmitting a blocking signal, that a fault or failure has occurred, and/or any other status of trip mechanism 114 and/or circuit protection device 102. In some embodiments, display device 120 presents a graphical user interface (GUI) to a user for interaction between the user and circuit protection device 102. The GUI permits the user, for example, to control circuit protection device 102, monitor operation/status of circuit protection device 102, test operation of circuit protection device 102, and/or modify operational parameters of circuit protection device 102.

In an exemplary embodiment, power distribution system 100 includes a remote computing device 121. Remote computing device 121 is remote in that it is not incorporated within one of the circuit protection devices 102, but may be located near other components of power distribution system 100. Remote computing device 121 includes processor 116 coupled to memory 118, input device 119, and display device 120. Remote computing device 121 is communicatively coupled to one or more of circuit protection devices 102. Remote computing device 121 may be directly connected to one or more circuit protection devices 102 and/or may be coupled to one or more circuit protection devices 102 via a network, including the Internet. The communicative coupling between remote computing device 121 and circuit protection device(s) 102 may be a wired connection or a wireless connection using any suitable wired and/or wireless communication protocols. In other embodiments, power distribution system 100 does not include remote computing device.

In an exemplary embodiment, circuit protection devices 102 are arranged in a hierarchy including a plurality of tiers 122, or circuit branches, to provide different levels of protection and monitoring to power distribution system 100. For example, in one embodiment, a first circuit protection device 124 is arranged in a first, or upstream, tier 126 to receive current from electrical power source 104. A second circuit protection device 128 is arranged in a second, or intermediate, tier 130 that is downstream of first circuit protection device 124. A third circuit protection device 132 is arranged in a third, or downstream, tier 134 that is downstream of second circuit protection device 128 and first circuit protection device 124. Third circuit protection device 132 provides current received from electrical power source 104 (through first circuit protection device 124 and second circuit protection device 128) to load 106. As used herein, the term "downstream" refers to a direction from electrical power source 104 towards load 106. The term "upstream" refers to a direction opposite the downstream direction, for example, from load 106 towards electrical power source 104.

First circuit protection device 124 includes a first trip unit 136, a first sensor 138, and a first trip mechanism 140, second circuit protection device 128 includes a second trip unit 142, a second sensor 144, and a second trip mechanism 146, and third circuit protection device 132 includes a third trip unit 148, a third sensor 150, and a third trip mechanism 152.

While FIG. 1 illustrates three circuit protection devices 102 arranged in three tiers 122, it should be recognized that any suitable number of circuit protection devices 102 may be arranged in any suitable number of tiers 122 to enable power distribution system 100 to function as described herein. For example, it should be recognized that one or more additional tiers 122 and/or circuit protection devices 102 may be disposed between electrical power source 104 and first circuit protection device 124 and/or first tier 126 in some embodiments. Additionally or alternatively, one or more additional tiers 122 and/or circuit protection devices 102 may be disposed between load 106 and third circuit protection device 132 in some embodiments. Further, each tier 122 will generally include more than one circuit protection device 102.

As illustrated in FIG. 1, each trip unit 110 includes a plurality of ports 154 that receive signals from, and/or transmit signals to, other trip units 110. In an exemplary embodiment, ports 154 include at least one blocking signal input port 156 and at least one blocking signal output port 158. Blocking signal input port 156 and blocking signal output port 158 transmit one or more blocking signals 160 between circuit protection devices 102. Each trip unit's ports 154 may be physically separate ports 154 or may be a single physical port providing one or more virtual ports (e.g., ports 156 and 158).

In an exemplary embodiment, blocking signal 160 is generated by each trip unit 110 when an amount of current detected by sensor 112 exceeds a blocking threshold (not shown) defined for an associated trip mechanism 114. In addition, blocking signal 160 is transmitted, or forwarded, to an upstream trip unit 110 if blocking signal 160 is received from a downstream trip unit 110. For example, blocking signal 160 of second trip unit 142 is transmitted to upstream trip unit 110 (e.g., first trip unit 136) if second trip unit 142 received blocking signal 160 from third trip unit 148 and/or if second trip unit 142 detected a current above the blocking threshold. In response to receiving blocking signal 160, first trip unit 136 may shift from an unrestrained mode of operation to a restrained mode of operation, to prevent first trip unit 136 and second trip unit 142 from operating at similar trip timing sequences. Additionally or alternatively, first trip unit 136 may switch to operating at, or using, a higher trip threshold, such as switching from a protective threshold to a backup threshold, in response to receiving blocking signal 160.

In the unrestrained mode of operation, an unrestrained trip timing sequence may be executed that includes accumulating time values in which the current exceeds the protective threshold until an unrestrained time threshold is reached. In the restrained mode of operation, a restrained trip timing sequence may be executed that includes accumulating time values in which the current exceeds the backup threshold until a restrained time threshold is reached. If the restrained time threshold or the unrestrained time threshold is reached, trip unit 110 generates trip signal 162. Alternatively, the unrestrained trip timing sequence and the restrained trip timing sequence may include any other actions or responses that enable trip units 110 to function as described herein. It should be recognized that the unrestrained trip timing sequence causes trip signal 162 to be generated in a period of time that is shorter than a period of time in which the restrained trip timing sequence causes trip signal 162 to be generated.

Ports 154 of a trip unit 110 are coupled to ports 154 of other trip units 110 by one or more conductors 164. In an exemplary embodiment, each port 154 includes a positive terminal and a negative terminal for coupling to conductors 164 carrying positive and negative signals, respectively. For example, conductors 164 transmit positive and negative components of blocking signals 160 to the positive and negative terminals of ports 154. Alternatively, ports 154 may receive any suitable signal and/or may include any suitable number of terminals that enables trip units 110 to function as described herein. It should be recognized that signals of the same polarity may be used instead of signals of positive and negative polarity. For example, a "positive" signal may be a signal that has an amplitude that is higher than an amplitude of a "negative" signal.

In an exemplary embodiment, blocking signal output port 158 of trip unit 110 (e.g., second trip unit 142) is coupled to blocking signal input port 156 of upstream trip unit 110 (e.g., first trip unit 136). In a specific embodiment, a single circuit protection device 102 is positioned at the next tier upstream of the referenced circuit protection device 102 (and the associated trip unit 110) such that blocking signal output port 158 of the referenced trip unit 110 is coupled to blocking signal input port 156 of the upstream trip unit 110 by at least one conductor 164. In addition, blocking signal input port 156 of the referenced trip unit 110 (e.g., second trip unit 142) is coupled to blocking signal output port 158 of one or more downstream trip units 110 (e.g., third trip unit 148) by at least one conductor 164.

Each circuit protection device 102 (and each associated trip unit 110) is configured as described above such that trip units 110 receive one or more blocking signals 160 from downstream trip units 110 through blocking signal input port 156 and transmit one or more blocking signals 160 to upstream trip units 110 through blocking signal output port 158. In an exemplary embodiment, blocking signals 160 received from a downstream trip unit 110 are automatically forwarded on to upstream trip units 110. For example, if second trip unit 142 receives blocking signal 160 from third trip unit 148, second trip unit 142 transmits blocking signal 160 to first trip unit 136.

In addition, sensor 112 measures current flowing through trip mechanism 114 (e.g., through electrical distribution bus 108 that is coupled to trip mechanism 114). Sensor 112 generates a current signal 166 representative of the measured or detected current flowing through trip mechanism 114, and transmits current signal 166 to trip unit 110. Trip unit 110 is programmed to activate trip mechanism 114 based on current signal 166 by transmitting trip signal 162 to trip mechanism 114 (and more particularly, to trip coil 115), thus causing trip mechanism 114 to interrupt the current flowing therethrough as described above.

During operation, if a fault (also sometimes referred to as a fault event) occurs proximate to second circuit protection device 128, for example, second sensor 144 detects the total amount of current (including a fault current) flowing through electrical distribution bus 108. Second sensor 144 transmits current signal 166 to second trip unit 142, and second trip unit 142 compares the amount of current represented by current signal 166 to one or more predetermined current thresholds of second trip unit 142, such as the blocking threshold.

If the detected amount of current exceeds the blocking threshold, second trip unit 142 transmits blocking signal 160 to first trip unit 136. In addition, if the detected amount of current exceeds the protective threshold, second trip unit 142 initiates a trip timing sequence, such as the unrestrained trip timing sequence. In contrast, if the detected amount of current exceeds the blocking threshold but does not exceed the protective threshold, second trip unit 142 refrains from initiating a trip timing sequence. Upon the receipt of blocking signal 160, first trip unit 136 switches to operating in the restrained mode of operation and uses, or operates at, the backup threshold. Accordingly, first trip unit 136 accumulates time values in which the current exceeds the backup threshold until the restrained time threshold is reached. If the restrained time threshold is reached, first trip unit 136 generates trip signal 162. Accordingly, first trip unit 136 does not initiate a trip sequence (after receiving blocking signal 160) until the current exceeds the backup threshold.

First trip unit 136 and third trip unit 148 operate similarly as second trip unit 142. Accordingly, first trip unit 136 and third trip unit 148 compare detected amounts of current with one or more predetermined current thresholds, such as the blocking threshold, the protective threshold, and/or the backup threshold. In a similar manner as described above, first trip unit 136 and third trip unit 148 initiate trip timing sequences if the protective threshold or the backup threshold is exceeded, and generate blocking signal 160 if the blocking threshold is exceeded. First trip unit 136 and third trip unit 148 transmit blocking signals 160 to upstream trip units 110 (if present) if the blocking threshold is exceeded. Other embodiments employ different ZSI protection schemes.

Power distribution system 100 includes monitoring systems 168. Monitoring systems 168 monitor functional operability of circuit protection devices 102 prior to the occurrence of a fault event. As shown in FIG. 1, monitoring systems 168 may be incorporated into circuit protection devices 102 or may be separate from circuit protection devices 102. In some embodiments monitoring systems 168 are incorporated into trip units 110. Monitoring systems 168 may be any suitable analog and/or digital systems. In some embodiments monitoring systems 168 are embodied, e.g., as software, in a computing device, including for example processor 116 and/or memory 118 of trip unit 110. In the example embodiment, each monitoring system 168 is associated with a single circuit protection device 102. In other embodiments, one monitoring system 168 may monitor more than one circuit protection device 102.

Each monitoring system 168 monitors a variable associated with operation of its associated circuit protection device 102. The monitored variable may be any variable that affects, or may affect, the operability of circuit protection device 102. In an example embodiment, the monitored variable is trip coil 115. More particularly, the functional capability of trip coil 115 is monitored. In other embodiments, the monitored variable is the amount of time that has passed since the circuit protection device was last serviced. Other example variables that may be monitored include one or more sensors (such as sensor 112), timing of trip mechanism 114 operation (e.g., how long it takes to trip after receiving a trip signal), ambient temperature in/around circuit protection device 102 (both instantaneous peaks and values over time), the temperature of one or more components (both instantaneous and over time), the amount of energy handled by the circuit protection device 102, the number of operations/trips, the change or rate of change of a variable over time, and/or a combination of variables.

Monitoring systems 168 determine, prior to the occurrence of a fault event, when their associated circuit protection devices 102 have failed or are likely to fail to operate properly. Generally, each monitoring system 168 determines, based at least in part on the monitored variable(s), when the likelihood of a malfunction of its associated circuit protection device 102 exceeds a threshold (sometimes referred to as a functionality threshold). As used herein, a likelihood includes any suitable characterization of how likely an event (e.g., a malfunction of a circuit protection device) is to occur. In some embodiments, the likelihood is a probability. In other examples, a likelihood may be a determination that it is more likely than not that a malfunction will occur. A malfunction of a circuit protection device may be a complete malfunction, such as a failure of the circuit protection device to trip in response to detecting an overcurrent condition, or a partial malfunction, such as a failure of the circuit protection device to trip as quickly as expected. Malfunctions may also include, but are not limited to, failure or inaccuracy of one or more sensors, tripping at incorrect tripping thresholds, or any other partial or complete malfunction of a circuit protection device that prevents the circuit protection device from operating as expected. In an exemplary embodiment, the determination is made by comparison of the monitored variable to a threshold value. When the monitored variable exceeds the threshold value, the likelihood of the circuit protection device failing to operate properly exceeds the functionality threshold. For example, as the amount of time since circuit protection device 102 was serviced (e.g., cleaned, inspected, maintained, or repaired) increases, the chances that circuit protection device 102 will fail increases. When the amount of time exceeds some threshold, the likelihood of the circuit protection device failing to operate will exceed a functionality threshold (e.g., 25%, 50%, 75%, 90%, etc.).

For some variables, the threshold may indicate that the circuit protection device 102 has failed and will not operate (i.e. 100% likelihood that it will fail to operate properly). For example, if the monitored variable is the functionality of trip coil 115, the variable is typically a binary variable indicating either that trip coil 115 is functional or trip coil 115 is non-functional. If trip coil 115 is non-functional, trip mechanism 114 cannot interrupt current through circuit protection device 102. In some embodiments, a likelihood of failure is calculated from one or more monitored variable(s) and the calculated likelihood is compared to the functionality threshold. For example, the likelihood of failure due to elapsed time since last maintenance may increase as a function of the temperature in circuit protection device 102, the number of times circuit protection device 102 has tripped during that time, etc. These monitored variables may be used in combination to determine the likelihood of failure for comparison to the functionality threshold.

The functionality threshold may be varied depending on the particular system 100, the level of risk tolerance, the level of nuisance trip tolerance, the accuracy of the monitoring of the variables, etc. In some embodiments, monitoring system 168 determines the functionality threshold as a function of at least one operating condition. Monitoring system may calculate a functionality threshold that varies based on a current temperature around circuit protection device 102, previous temperatures around circuit protection device, current voltage, current, or power handled by circuit protection device 102, or any other suitable operating condition. For example, for a given set of monitored variables, the likelihood of circuit protection device 102 failing to operate properly may increase if the ambient temperature is exceptionally hot or exceptionally cold and the functionality threshold may be decreased accordingly.

In an exemplary embodiment, monitoring system 168 determines a likelihood of the circuit protection device 102 not functioning properly. This likelihood (e.g., a probability, a percentage, etc.) may be determined, based on the monitored variable(s), using one or more formulas, look-up tables, databases, or other suitable methods. In other embodiments, monitoring system 168 does not determine a particular value for the likelihood of circuit protection device 102 not functioning properly. Rather, monitoring system 168 indirectly determines whether the likelihood of the circuit protection device 102 not functioning properly exceeds the functionality threshold. Monitoring system indirectly determines this by, for example, comparing one monitored variable or a combination of the monitored variables to a threshold value corresponding to a likelihood of circuit protection device 102 not functioning properly that exceeds the functionality threshold.

When monitoring system 168 determines that the likelihood of circuit protection device 102 not functioning properly exceeds the functionality threshold, monitoring system 168 prevents its associated circuit protection device 102 from outputting a ZSI blocking signal. As discussed above, the ZSI blocking signal is output to an upstream circuit protection device to indicate that the issuing circuit protection device 102 has detected current over the blocking threshold. The ZSI blocking signal generally causes the receiving, upstream circuit protection device 102 to operate in a restrained mode to allow the sending/downstream circuit protection device a chance to handle the overcurrent condition. When monitoring system 168 prevents its associated circuit protection device 102 from sending a blocking signal, the upstream circuit protection device 102 will continue to operate in an unrestrained mode and will protect the portion of power distribution system 100 normally covered by the downstream/potentially faulty circuit protection device 102. In some embodiments, when a monitoring system 168 allows its associated circuit protection device 102 to pass on to an upstream circuit protection device 102 a ZSI blocking signal received from a downstream circuit protection device 102 even when the associated circuit protection device 102 has a likelihood of not functioning properly that exceeds the functionality threshold.

Monitoring system 168 may prevent its associated circuit protection device 102 from outputting a ZSI signal by any suitable method. For example, monitoring system 168 may open a switch coupled to blocking signal output port 158 to interrupt the connection to an upstream circuit protection device 102. Alternatively, monitoring system 168 may interrupt the connection to an upstream circuit protection device 102 by grounding the output of blocking signal output port. In other embodiments, monitoring system 168 prevents its associated circuit protection device 102 from outputting a ZSI signal by disabling its ZSI blocking signal logic, either directly or by instructing the associated circuit protection device 102 to disable the ZSI blocking signal logic. In still other embodiments, the ZSI blocking signal logic of circuit protection device 102 incorporates an output of monitoring system. In such embodiments, the ZSI blocking logic outputs a ZSI blocking signal when both the monitored current exceeds a blocking threshold and the associated monitoring system 168 indicates that the likelihood of circuit protection device 102 not functioning properly does not exceed the functionality threshold. If the monitored current exceeds the blocking threshold and the associated monitoring system 168 indicates that the likelihood of circuit protection device 102 not functioning properly does exceed the functionality threshold, the ZSI logic does not allow output of a ZSI blocking signal.

In some embodiments, monitoring system 168 provides an alert when the likelihood of circuit protection device 102 not functioning properly exceeds the functionality threshold. The alert may be a human recognizable alert and/or a computer recognizable alert. Human recognizable alerts may be audio and/or visual indications, including, for example, lighting or extinguishing an LED or other light, displaying a message on display device 120, and/or sounding an audible alarm. Computer recognizable alerts may include sending a signal to another trip unit 110 and/or to remote computing device 121 informing the other device that the particular circuit protection device 102 has a likelihood of failure that exceeds its functionality threshold.

Figure 2:
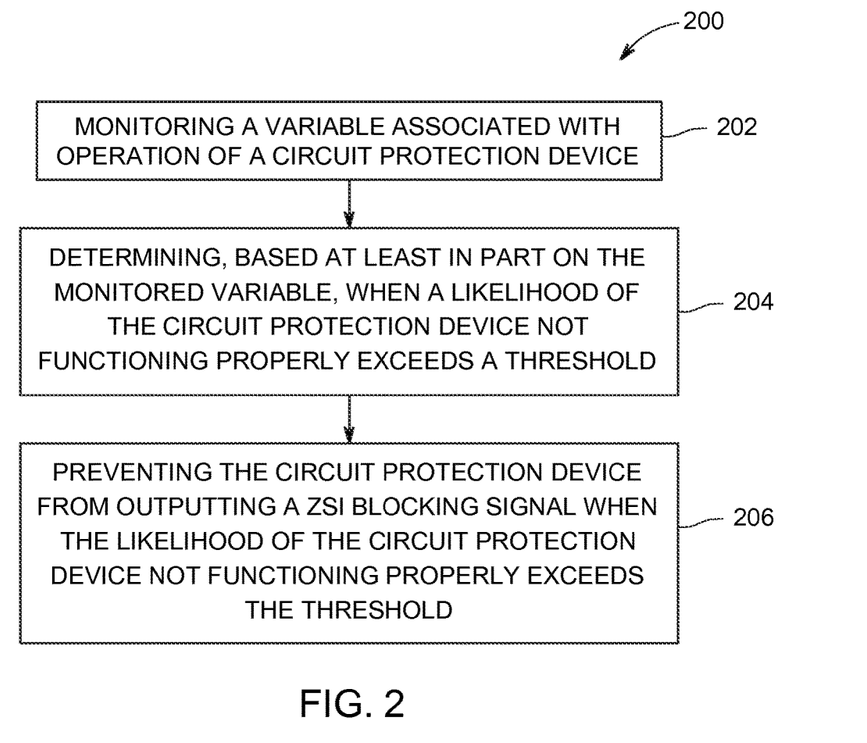
FIG. 2 is a flow diagram of an exemplary method of monitoring a circuit protection device, such as a circuit protection device in the power distribution system shown in FIG. 1.

FIG. 2 is a flow diagram of an exemplary method 200 of monitoring a circuit protection device in a ZSI system, such as power distribution system 100 (shown in FIG. 1). In an exemplary embodiment, method 200 is executed by monitoring system 168 of one or more of trip units 110. More particularly, method 200 may be executed by processor 116 of one or more of trip units 110. In an exemplary embodiment, a plurality of computer-executable instructions is embodied within a computer-readable medium, such as memory 118 (shown in FIG. 1). The instructions, when executed by the processor 116, cause the processor 116 to execute the steps of method 200 and/or to function as described herein.

Method 200 includes monitoring 202, a variable associated with operation of a circuit protection device. The circuit protection devices may be any circuit protection device 102 in system 100 that is downstream from another circuit protection device 102. At 204, the method includes determining, based at least in part on the monitored variable, when a likelihood of the circuit protection device not functioning properly exceeds a threshold. The circuit protection device is prevented 206 from outputting a ZSI blocking signal when the likelihood of the circuit protection device not functioning properly exceeds the threshold.

A technical effect of the methods and systems described herein may include one or more of: (a) monitoring a variable associated with operation of a circuit protection device; (b) determining, based at least in part on a monitored variable, when a likelihood of a circuit protection device not functioning properly exceeds a threshold; and (c) preventing a circuit protection device from outputting a ZSI blocking signal when the likelihood of the circuit protection device not functioning properly exceeds a threshold.

Exemplary embodiments of circuit protection devices, power distribution systems and methods of monitoring a power distribution system and/or a circuit protection device are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the power system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of monitoring a circuit protection device in a zone selective interlocking (ZSI) system, said method comprising:
   monitoring a variable associated with operation of the circuit protection device;
   determining, prior to a fault event and based at least in part on the monitored variable, when a likelihood of a malfunction of the circuit protection device exceeds a predetermined threshold; and
   preventing, when a fault event is detected by the circuit protection device, the circuit protection device from outputting a ZSI blocking signal when the likelihood of the malfunction of the circuit protection device exceeds the threshold.

2. A method in accordance with claim 1, wherein the circuit protection device is a circuit breaker and monitoring a variable associated with operation of the circuit protection device comprises monitoring a trip coil in the circuit breaker.

3. A method in accordance with claim 1, wherein monitoring a variable associated with operation of the circuit protection device comprises monitoring a length of time since the circuit protection device was serviced.

4. A method in accordance with claim 1, wherein monitoring a variable associated with operation of the circuit protection device comprises monitoring a combination of a plurality of variables associated with operation of the circuit protection device.

5. A method in accordance with claim 1, wherein preventing the circuit protection device from outputting a ZSI blocking signal comprises disabling the circuit protection device's ZSI blocking signal logic.

6. A method in accordance with claim 1, wherein determining when a likelihood of a malfunction of the circuit protection device exceeds a predetermined threshold comprises determining when a probability of a malfunction of the circuit protection device exceeds the predetermined threshold.

7. A method in accordance with claim 1, further comprising providing an alert when the likelihood of the circuit protection device not functioning properly exceeds the threshold.

8. A method in accordance with claim 1, further comprising determining the threshold as a function of at least one operating condition.

9. A circuit protection device comprising:
   a trip mechanism configured to interrupt a current flowing through said circuit protection device; and
   a trip unit operatively coupled to said trip mechanism, said trip unit configured to:
      monitor current flowing through said circuit protection device;
      monitor a variable associated with operation of said circuit protection device;
      determine whether the monitored current exceeds a predetermined zone selective interlocking (ZSI) blocking threshold;
      determine, prior to a fault event and based at least in part on the monitored variable, when a likelihood of a malfunction of said circuit protection device exceeds a predetermined functionality threshold;

output a ZSI blocking signal when the monitored current exceeds the ZSI blocking threshold and the likelihood of said circuit protection device not functioning does not exceed the functionality threshold; and prevent output of the ZSI blocking signal when the monitored current exceeds the ZSI blocking threshold and the likelihood of the malfunction of said circuit protection device exceeds the functionality threshold.

10. A circuit protection device in accordance with claim 9, wherein said trip mechanism comprises a trip coil and the monitored variable is indicative of a functional capability of the trip coil.

11. A circuit protection device in accordance with claim 9, wherein the monitored variable is a length of time since said circuit protection device was serviced.

12. A circuit protection device in accordance with claim 9, wherein the monitored variable is a combination of a plurality of variables associated with operation of said circuit protection device.

13. A circuit protection device in accordance with claim 9, wherein said trip unit comprises a ZSI output port and said trip unit is configured to prevent output of the ZSI blocking signal by interrupting a connection between said ZSI output port and an upstream protection device.

14. A circuit protection device in accordance with claim 9, wherein said trip unit is configured to provide an alert when the likelihood of the circuit protection device not functioning properly exceeds the functionality threshold.

15. A circuit protection device in accordance with claim 9, wherein said trip unit is configured to determine the functionality threshold as a function of at least one operating condition.

16. A power distribution system comprising:
a first circuit protection device configured to interrupt a current flowing through said first circuit protection device; and
a second circuit protection device downstream of said first circuit protection device, said second circuit protection device comprising:
a trip mechanism configured to interrupt current flowing through said second circuit protection device; and
a trip unit operatively coupled to said trip mechanism, said trip unit configured to:
monitor current flowing through said second circuit protection device;
determine whether the monitored current exceeds a predetermined zone selective interlocking (ZSI) blocking threshold; and
output a ZSI blocking signal to said first circuit protection device when the monitored current exceeds the ZSI blocking threshold; and
a monitoring system coupled to said second circuit protection device, said monitoring system configured to:
monitor a variable associated with operation of said second circuit protection device;
determine, prior to a fault event and based at least in part on the monitored variable, when a likelihood of a malfunction of said second circuit protection device exceeds a predetermined functionality threshold; and
prevent output of the ZSI blocking signal from said second circuit protection device when the monitored current of said second circuit protection device exceeds the ZSI blocking threshold and the likelihood of the malfunction of said second circuit protection device exceeds the functionality threshold.

17. A power distribution system in accordance with claim 16, wherein said monitoring system is part of said second circuit protection device.

18. A power distribution system in accordance with claim 17, wherein said second circuit protection device trip mechanism comprises a trip coil and the monitored variable is indicative of a functional capability of the trip coil.

19. A power distribution system in accordance with claim 17, wherein the monitored variable is a length of time since said second circuit protection device was serviced.

20. A power distribution system in accordance with claim 16, further comprising a third circuit protection device downstream from said second circuit protection device, wherein said monitoring system is configured to allow said second circuit protection device trip unit to pass a ZSI blocking signal from said third circuit protection device to said first circuit protection device when the likelihood of the malfunction of said second circuit protection device exceeds the functionality threshold.

* * * * *